United States Patent [19]

Sassa

[11] Patent Number: 4,845,829
[45] Date of Patent: Jul. 11, 1989

[54] METHOD OF MANUFACTURING SEPARABLE SLIDE FASTENER

[75] Inventor: Yusei Sassa, Namerikawa, Japan

[73] Assignee: Yoshida Kogyo K. K., Tokyo, Japan

[21] Appl. No.: 219,608

[22] Filed: Jul. 15, 1988

[30] Foreign Application Priority Data

Aug. 1, 1987 [JP] Japan .................................. 62-193547

[51] Int. Cl.[4] ......................... B21D 53/50; B29D 5/00
[52] U.S. Cl. ...................................... 29/409; 29/408; 29/33.2; 29/766
[58] Field of Search ................. 29/409, 408, 33.2, 766

[56] References Cited

U.S. PATENT DOCUMENTS

| 3,081,462 | 3/1963 | Radovsky et al. | 2/265 |
| 3,127,670 | 4/1964 | Broning | 29/408 |
| 4,361,946 | 12/1982 | Takamatsu | 29/408 |

FOREIGN PATENT DOCUMENTS

| 0083110 | 12/1982 | European Pat. Off. | |
| 0171744 | 2/1986 | European Pat. Off. | |
| 2255869 | 8/1954 | France | |
| 2000184 | 8/1969 | France | |
| 48-38390 | 11/1973 | Japan | |
| 961956 | 11/1960 | United Kingdom | |
| 948794 | 2/1964 | United Kingdom | 29/408 |
| 1115487 | 5/1968 | United Kingdom | |
| 1259270 | 1/1972 | United Kingdom | |

Primary Examiner—P. W. Echols
Assistant Examiner—Kevin Jordan

[57] ABSTRACT

An elongate continuous slide fastener chain is fed in alternately opposite longitudinal directions in various steps (a) through (e). First, reinforcing film members are attached to the chain across an element-free space, and then a hole is defined in the chain across the element-free space. Thereafter, an insertable pin, a box pin, and a box are attached to the chain through the hole, and then a slider is mounted on a pair of rows of coupling elements through the element-free space. Finally, top end stops are fixed to beaded edges of the chain, which is then cut off transversely thereacross into a separable slide fastener.

2 Claims, 4 Drawing Sheets

METHOD OF MANUFACTURING SEPARABLE SLIDE FASTENER

BACKGROUND OF THE INVENTION

1. Field of the Invention

The present invention relates to a method of manufacturing a separable slide fastener having a top end stop mounted on the upper end thereof and a separable box-and-pin assembly on the lower end thereof which comprises a box, a box pin joined to the box, and a pin insertable into the box.

2. Description of the Prior Art

One known method of manufacturing a separable slide fastener is disclosed in Japanese Patent Publication No. 48-38390 published Nov. 16, 1973, for example. According to the disclosed method, an elongate slide fastener chain composed of a pair of intermeshing rows of helically coiled or zigzag coupling elements mounted on the respective inner longitudinal edges of slider fastener stringer tapes is continuously fed along in one longitudinal direction. While the fastener chain is being progressively fed, it is automatically processed in various successive steps including the formation of an element-free space, the attachment of a reinforcing film, the preparation of an attachment bead for a box pin and an insertable pin, the removal of beaded edges, the punching-out of a hole, the mounting of a slider, the attachment of top end stops, the attachment of the box pin and the insertable pin, the attachment of a box, and the cutting of the chain into a shorter slide fastener length.

The speed at which the slide fastener chain is to be fed along the production line is governed by the processing step which is most time-consuming since the slide fastener chain is continuously fed along in the longitudinal direction during the manufacturing process. Therefore, the efficiency of the production process cannot be increased to a sufficient level. The maintenance of various machines required to perform the manufacturing steps is relatively tedious and time-consuming.

SUMMARY OF THE INVENTION

In view of the foregoing shortcomings of the conventional method of manufacturing separable slide fasteners, it is an object of the present invention to provide a method of manufacturing a separable slide fastener highly efficiently through facilitated operation at each processing step while allowing machines required in the respective steps to be simplified and maintained and serviced easily.

According to the present invention, there is provided a method of manufacturing a separable slide fastener from an elongate continuous slide fastener chain having a pair of stringer tapes supporting a pair of intermeshing rows of coupling elements on respective longitudinal beaded edges thereof, with longitudinally spaced element-free spaces defined in the rows of coupling elements, the method comprising the steps of: (a) feeding the slide fastener chain in one longitudinal direction, stopping the chain, and attaching a reinforcing film to the stringer tapes across an element-free space adjacent to leading coupling elements; (b) after the step (a), feeding the slide fastener chain in an opposite longitudinal direction opposite to said one direction, stopping the chain, and defining a hole in the stringer tapes across the element-free space; (c) after the step (b), feeding the slide fastener chain in said one direction and attaching an insertable pin, a box pin, and a box to the slide fastener chain through the hole; (d) after the step (c), feeding the slide fastener chain in the opposite direction and mounting a slider on the rows of coupling elements through the element-free space; and (e) after the step (d), feeding the slide fastener chain in said one direction, stopping the slide fastener chain, attaching top end stops to the beaded edges adjacent to trailing coupling elements, and cutting off the slide fastener chain transversely along the hole into a separable slide fastener. The above steps (a) through (e) are carried out independently of each other.

Many other advantages and features of the present invention will become manifest to those versed in the art upon making reference to the detailed description and the accompanying sheets of drawings in which a preferred structural embodiment incorporating the principles of the present invention is shown by way of example.

DETAILED DESCRIPTION

A method of manufacturing a separable slide fastener comprises five steps, i.e., the step (a) of applying a reinforcing film to a continuous slide fastener chain, the step (b) of defining a hole in the slide fastener chain, the step (c) of attaching an insertable pin, a box pin, and a box to the slide fastener chain, the step (d) of mounting a slider on the slide fastener chain, and the step (e) of attaching a top end stop to and cutting off the slide fastener chain.

These steps (a) through (e) are not effected continuously or in one continuous process. Rather, an elongate continuous slide fastener chain is processed in each of these steps while being fed in one direction, and is stored in a container after it is processed. In the next step following one such step, the slide fastener chain is withdrawn from the container belonging to the preceding step, and fed in the direction opposite to the direction in which the slide fastener chain has been fed in the previous step, while it is being processed. In each of the steps (c) and (d) which are comparatively low in productivity by themselves, the number of machines or devices each used to perform the step is increased to keep up with the productivity of the other steps. The slide fastener chains are fed in the opposite directions in one of the steps and the following step to allow the slide fastener chain to be easily withdrawn from the container belonging to the previous step, and also to permit insertable pins, box pins, and boxes to be attached to, and also sliders to be mounted on, the slide fastener chain in appropriate directions.

Figure 1:
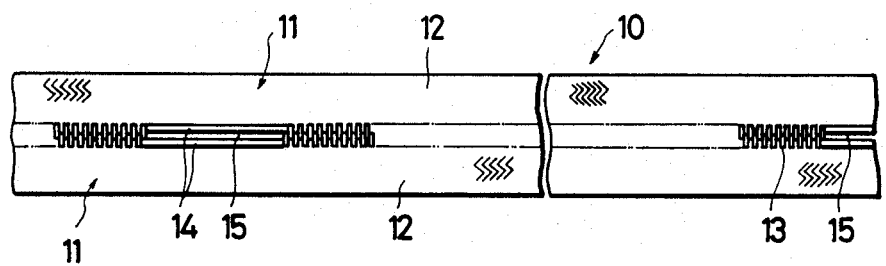
FIG. 1 is a fragmentary plan view of an elongate continuous slide fastener chain to be processed by a manufacturing method according to the present invention.

FIG. 1 shows an elongate continuous slide fastener chain 10 to be processed into separable slide fasteners. The slide fastener chain 10 comprises a pair of stringers 11 composed of respective stringer tapes 12, and a pair of intermeshing rows of coupling elements 13 mounted on respective inner confronting beaded edges 14 of the stringer tapes 12. The slide fastener chain 10 has a plurality of longitudinally spaced element-free spaces or gaps 15 of certain length. The slide fastener chain 10 is processed while the rows of coupling elements 13 are being in mesh with each other as shown.

Figure 2:
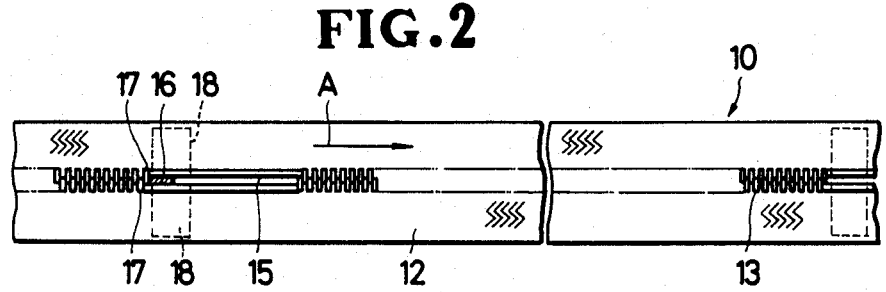
FIG. 2 is a fragmentary plan view of the chain processed in a step of attaching a reinforcing film.
Figure 3:
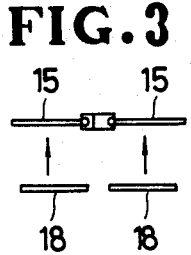
FIG. 3 is an end elevational view of the chain showing the manner in which the reinforcing film is applied to the chain.

FIGS. 2 and 3 illustrate the step (a) of applying a reinforcing film to the slider fastener chain 10. As shown in FIG. 2, while the slide fastener chain 10 is being fed along in the direction of the arrow A, a positioning stop 16 projects into one of the element-free spaces 15 where a reinforcing film is to be applied across the slide fastener chain 10. More specifically, the positioning stop 16 enters the element-free space 15 and engages leading one 17 of the coupling elements 13 to stop the slide fastener chain 10. Then, as shown in FIG. 3, the reinforcing film, or a pair of reinforcing film members 18 of thermoplastic synthetic resin is applied by being thermally fused to the back of the stringer tapes 12 transversely across the element-free space 15 adjacent to the leading coupling elements 17. In this manner, pairs of reinforcing film members 18 are successively applied to the back of the stringer tapes 12 across the respective element-free spaces 15. The slide fastener chain 10 with the reinforcing film members 18 thus applied is stored in a container (not shown) located just downstream of the station where the step (a) is carried out.

Figure 4:
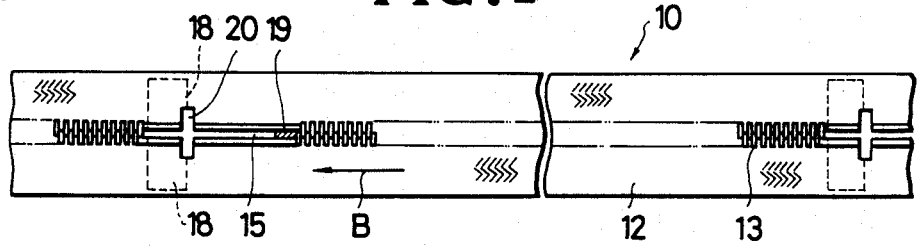
FIG. 4 is a fragmentary plan view of the chain in a step of defining a hole.
Figure 5:
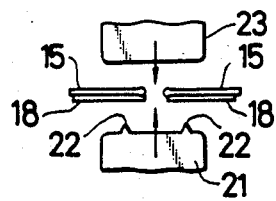
FIG. 5 is an end elevational view of the chain showing the manner in which the hole is defined in the chain.

FIGS. 4 and 5 show the step (b) of defining a hole in the slider fastener chain 10. The terminal end of the slide fastener chain 10 which is stored in the container is pulled out from the upper opening of the container, and the slide fastener chain 10 is fed in the direction of the arrow B (FIG. 4) which is opposite to the direction of the arrow A (FIG. 2). Since the terminal end of the slide fastener chain 10 is pulled out, it is not necessary to turn the container upside down to find and pull out the leading end of the slide fastener chain 10. As illustrated in FIG. 4, the slide fastener chain 10 is stopped by a positioning stop 19 projecting into the space 15, and then the stringer tapes 12 are punched to define a hole 20 across the space 15 near one end thereof. As shown in FIG. 5, the hole 20 is defined by an anvil 21 having cutter blades 22 on its upper surface and disposed below the slide fastener chain 10 and an ultrasonic horn 23 disposed above the slide fastener chain 10, the anvil 21 and the ultrasonic horn 23 being vertically moved toward each other until they are pressed against each other. Successive holes 20 are defined in the respective spaces 15, and the slide fastener chain 10 is then stored in a container disposed downstream of the station where the step (b) is carried out.

Figure 6:
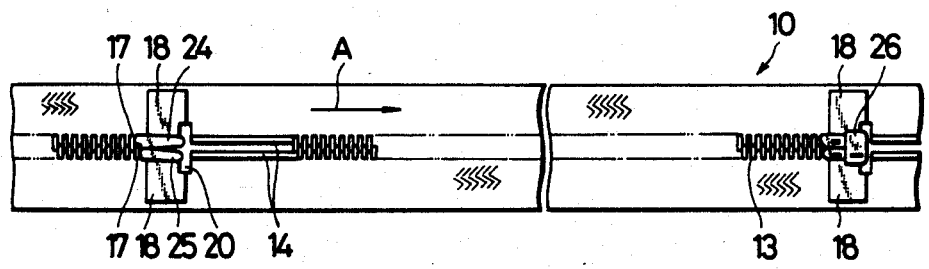
FIG. 6 is a fragmentary bottom view of the chain in a step of attaching an insertable pin, a box pin, and box.
Figure 7:
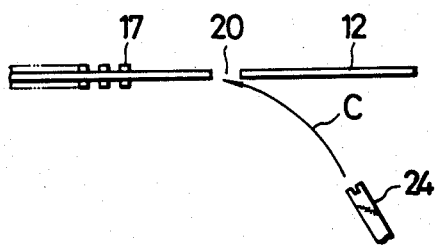
FIG. 7 is a fragmentary side elevational view of the chain showing the manner in which the insertable pin is attached to the chain.
Figure 8:
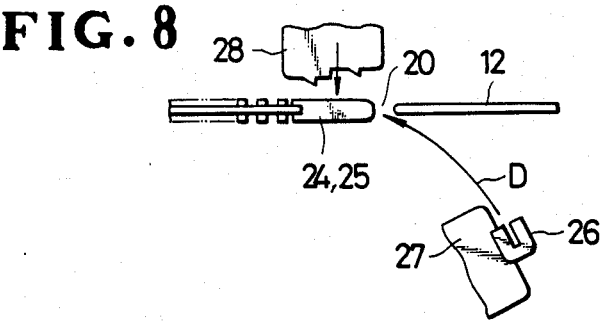
FIG. 8 is a fragmentary side elevational view of the chain illustrating the manner in which the box is attached to the chain.

FIGS. 6, 7, and 8 illustrate the step (c) of attaching an insertable pin, a box pin, and a box on the slide fastener chain 10. The terminal end of the slide fastener chain 10 stored in the container belonging to the step (b) is pulled out from the upper opening of the container, and the slide fastener chain 10 is fed in the direction of the arrow A (FIG. 6). As shown in FIG. 6, an insertable pin 24 and a box pin 25 are fitted over and attached to the beaded edges 14, respectively, and then a box 26 is fitted over the distal ends of the pins 24, 25 and fixed to the pin 25 by staking. FIG. 7 shows the manner in which the insertable pin 24 is attached to the beaded edge 14. More specifically, the pin 24 is inserted obliquely upwardly in the direction of the arrow C which is substantially opposite to the direction of the arrow A, through the space 15 and the hole 20, and fitted over the beaded edge 14 which is reinforced by the reinforcing film member 18. The box pin 25 is also attached in the same manner. FIG. 8 illustrates the manner in which the box 26 is attached to the ends of the pins 24, 25, and the pins 24, 25 are secured to the stringer tapes 12. The box 26 supported on a die 27 is brought obliquely upwardly in the direction of the arrow D which is also substantially opposite to the direction of the arrow A, through the space 15 and the hole 20, and fitted over the ends of the pins 24, 25. Then, a punch 28 is lowered toward the die 27 to secure the pins 24, 25 to the respective beaded edges 14, and also to fix the box 26 to the box pin 25 by staking, with the end of the insertable pin 24 inserted in the box 26. After pins and boxes are successively attached to the slide fastener chain 10, the slide fastener chain 10 is stored in a container.

Figure 9:
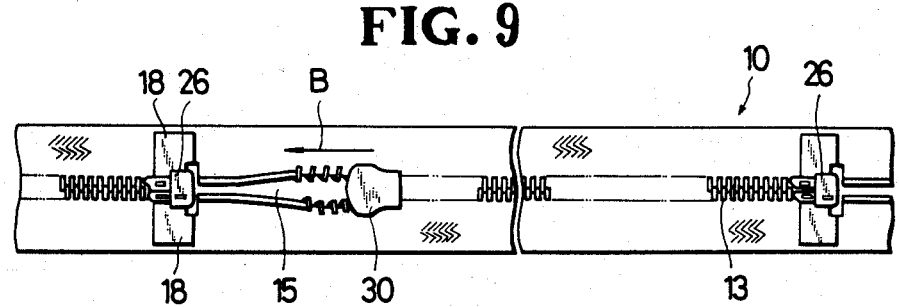
FIG. 9 is a fragmentary bottom view of the chain in a step of mounting a slider.
Figure 10:
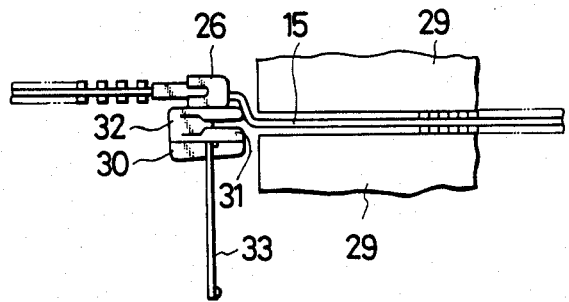
FIG. 10 is a fragmentary side elevational view showing the manner in which the slider is mounted on the chain.

FIGS. 9 and 10 show the step (d) of mounting a slider on the slide fastener chain 10. The slide fastener chain 10 is pulled, at its terminal end, from the container of the previous step (c), and fed in the direction of the arrow B (FIG. 9). A slider 30 is placed in the space 15, and the rows of coupling elements 13 are threaded through the slider 30 upon movement of the slide fastener chain 10. More specifically, as shown in FIG. 10, the slider 30 supported on a slider holder (not shown) which is moved upwardly is held against the box 26, and the slide fastener chain 10 is bent by gripping the same between element guides 29 at its space 15. Upon movement of the slide fastener chain 10 to the left (FIG. 10), the slider 30 is placed in the space 15, and the rows of coupling elements 13 enter the slider 30 from a throat 31 and leave the slider 30 from a pair of shoulders 32. As the rows of coupling elements 13 are thus moved through the slider 30, they are forcibly disengaged from each other as shown in FIG. 9. Thereafter, a pull tab 33 of the slider 30 is released from the slider holder, whereupon the mounting of the slider 30 is completed. The slide fastener chain 10 with successive sliders 30 thus mounted is then stored in a container.

Figure 11:
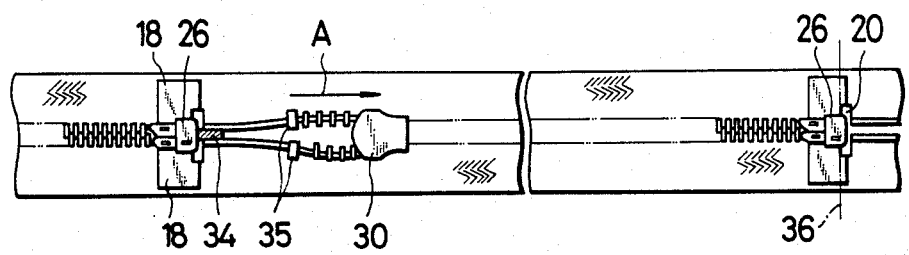
FIG. 11 is a fragmentary bottom view of the chain in steps of attaching top end stops and cutting off the chain.
Figure 12:
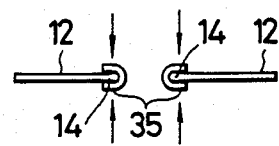
FIG. 12 is an end elevational view of the chain illustrative of the manner in which the top end stops are applied to the chain.

The step (e) of attaching top end stops and cutting off the slide fastener chain 10 is illustrated in FIGS. 11 and 12. The slide fastener chain 10 is pulled out of the container of the previous step (d) and then fed in the direction of the arrow A as shown in FIG. 11. The slide fastener chain 10 is stopped by a positioning stop 34 projecting in the space 15 and engaging the box 26, whereupon top end stops 35 are attached to the beaded edges 14, respectively, at the trailing ends of the rows of coupling elements 13 opposite to the box 26. As shown in FIG. 12, the top end stops 35 are vertically pressed onto and secured to the beaded edges 14, respectively, by staking. The slide fastener chain 10 is thereafter cut off along a transverse line 36 across the reinforcing film members 18 along the hole 20.

Figure 13:
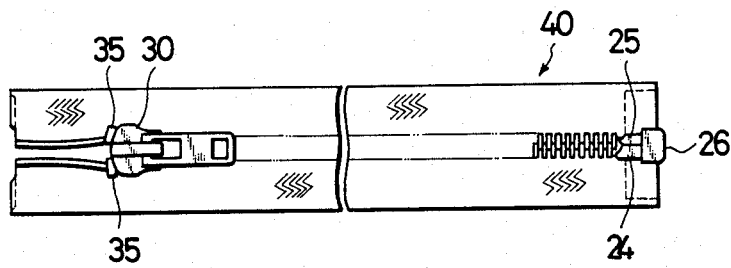
FIG. 13 is a fragmentary plan view of a separable slide fastener produced from the chain which has been processed by the manufacturing method of the present invention.

FIG. 13 shows a separable slide fastener 40 of shorter dimensions produced by cutting off the slide fastener chain 10 as shown in FIG. 11.

With the present invention, as described above, the steps (a) through (e) are carried out separately. Since the slide fastener chain 10 processed in one step is stored in the container thereof, and then pulled out at its terminal end from the upper opening of the container, and fed through the next step in the direction which is opposite to the direction in which the slide fastener chain has been fed in the previous step. Therefore, since the slide fastener chain is fed in alternately opposite directions in the successive steps, it can be efficiently removed from the container and smoothly transferred between the steps without undue time loss. The direction in which the slide fastener is to be fed can be selected to allow certain operations, e.g., the mounting of a slider, to be effected smoothly and quickly. Inasmuch as the steps (a) through (e) are effected independently of each other, the number of machines or devices used in a less efficient step may be increased to catch up with another more efficient step. Thus, the overall efficiency of the process remains high. The machine or device employed to carry out each step is not required to be constructed to meet the productivity of the machines or devices in the other steps, but may rather be simplified as it is only required to effect its own step. Therefore, the cost of the machine or device used may be lowered, and it can easily be maintained or serviced.

Obviously, various modifications and variations of the present invention are possible in the light of the above teaching. It is therefore to be understood that within the scope of the appended claims the invention may be practiced otherwise than as specifically described.

What is claimed is:

1. A method of manufacturing a separable slide fastener from an elongate continuous slide fastener chain having a pair of stringer tapes supporting a pair of intermeshing rows of coupling elements on respective longitudinal beaded edges thereof, with longitudinally spaced element-free spaces defined in the rows of coupling elements, said method comprising the steps of:
   (a) feeding the slide fastener chain in one longitudinal direction, stopping the chain, and attaching a reinforcing film to the stringer tapes across an element-free space adjacent to leading coupling elements;
   (b) after the step (a), feeding the slide fastener chain in an opposite longitudinal direction opposite to said one direction, stopping the chain, and defining a hole in said stringer tapes across said element-free space;
   (c) after the step (b), feeding the slide fastener chain in said one direction and attaching an insertable pin, a box pin, and a box to the slide fastener chain through said hole;
   (d) after the step (c), feeding the slide fastener chain in said opposite direction and mounting a slider on the rows of coupling elements through said element-free space; and
   (e) after the step (d), feeding the slide fastener chain in said one direction, stopping the slide fastener chain, attaching top end stops to the beaded edges adjacent to trailing coupling elements, and cutting off the slide fastener chain transversely along the hole into a separable slide fastener.

2. A method according to claim 1, wherein said steps (a) through (e) maybe carried out independently of each other in separate, discontinuous operations.

* * * * *